United States Patent [19]

Wakumura et al.

[11] Patent Number: 4,872,171

[45] Date of Patent: Oct. 3, 1989

[54] METHOD FOR RECORDING DIGITAL DATA SO AS TO AVOID OPERATIONAL ERROR ON REPRODUCTION

[75] Inventors: Shinichi Wakumura; Tokihiro Takahashi, both of Saitama, Japan

[73] Assignee: Pioneer Electronic Corporation, Tokyo, Japan

[21] Appl. No.: 138,124

[22] Filed: Dec. 28, 1987

[30] Foreign Application Priority Data

Dec. 27, 1986 [JP] Japan .................................. 315225
Dec. 27, 1986 [JP] Japan .................................. 315226
Dec. 27, 1986 [JP] Japan .................................. 315227

[51] Int. Cl.⁴ .................... G06F 11/00; G06F 11/10
[52] U.S. Cl. ................... 371/40.1; 371/47.1; 371/5.4
[58] Field of Search ............. 371/47, 37, 24, 38, 371/39, 40, 42, 67, 13, 44, 26

[56] References Cited

U.S. PATENT DOCUMENTS

| | | | |
|---|---|---|---|
| 4,466,099 | 8/1984 | Meltzer | 371/37 |
| 4,675,868 | 6/1987 | Shishikura | 371/37 |
| 4,688,221 | 8/1987 | Nakamura | 371/13 |
| 4,733,396 | 3/1988 | Baldwin | 371/38 |
| 4,775,978 | 10/1988 | Hartness | 371/38 |

Primary Examiner—Michael R. Fleming
Attorney, Agent, or Firm—Sughrue, Mion, Zinn, Macpeak & Seas

[57] ABSTRACT

A method for recording digital data on a tape in such a manner that the recorded data will not cause misoperations of the reproducing apparatus due to an excessive error rate. A flag in received data is monitored. When the flag indicates that a block of data contains more errors than can be corrected in the reproducing apparatus upon reproduction, the data block is either replaced by null data or a previously received data block having an acceptable error rate, the choice being in accordance with an input mode instruction.

6 Claims, 4 Drawing Sheets

METHOD FOR RECORDING DIGITAL DATA SO AS TO AVOID OPERATIONAL ERROR ON REPRODUCTION

BACKGROUND OF THE INVENTION

The present invention relates to a magnetic recording method which may be used with an R-DAT (rotary digital audio tape recorder) or the like.

Two types of data are recorded with an R-DAT, PCM audio data and sub-code data. Sub-code data is recorded in two regions, SUB-1 and SUB-2, of a track. The sub-code data in each region is composed of eight-block data, with one block being composed of 32-symbol data (one symbol consisting of 8 bits). Each block is labelled with hexadecimal addresses (composed of the ten numerals 0 to 9 and the six alphabetic characters A to F).

A set of odd-numbered symbols and a set of even-numbered symbols taken from two blocks, one labelled with an even-numbered address and the other labelled with an address of an odd number greater than that of the even-numbered address, are treated with as a single unit for error correction. If the set of odd-numbered symbols is referred to as error correction block A and the set of even-numbered symbols as error correction block B, it then follows that two error correction blocks A and B exist in the above-defined two blocks. Each error correction block consists of 32 symbols, 28 of which are assigned to data and the remaining four to parity.

In the sub-code data region, program time, absolute time, TOC information and other such types of information can be recorded as a packet. No sub-code is updated in a frame composed of two consecutive tracks with different head azimuths. An example of the information to be recorded in the two tracks is a time code for the same point in time. Each packet consists of a four-bit item and 60-bit data and parity. An item signifies the content of data of interest. For instance, items (0001) and (0010) represent a program time and an absolute time, respectively. Item (0000) denotes null information, with all data bits in it being zero.

In a conventional magnetic recording method, a situation occurs where a first unit in the apparatus reproduces a signal that is recorded with a second unit. Even if the sub-code data received as a signal to be recorded with the second unit contains an uncorrectable error, the conventional apparatus records the data unchanged. This potentially causes the apparatus to operate erroneously when the erroneous data is reproduced.

SUMMARY OF THE INVENTION

An object, therefore, of the present invention is to provide a magnetic recording method free from the aforementioned problems of the prior art system.

This and other objects of the present invention can be attained by a magnetic recording method comprising steps of evaluating the quality of a flag in an input signal that indicates the status of error correction; storing the processed signal as data to be recorded on magnetic tape; and rendering the data to be stored in the memory such as to avoid errors upon reproduction when an output from said decision circuit indicates that the quality of said flag is below a predetermined acceptable level.

DESCRIPTION OF THE PREFERRED EMBODIMENTS

A preferred embodiment of the invention will now be described. Briefly, a decision circuit included in an apparatus operating in accordance with the present invention evaluates the quality of a flag in an input signal that indicates the status of error correction. The input signal is processed in the processing circuit and subsequently stored in the memory. The data stored in the memory is controlled with the control circuit, being rendered substantially devoid of information depending upon the results of decision by the decision circuit, and subsequently recorded on magnetic tape.

Figure 1:
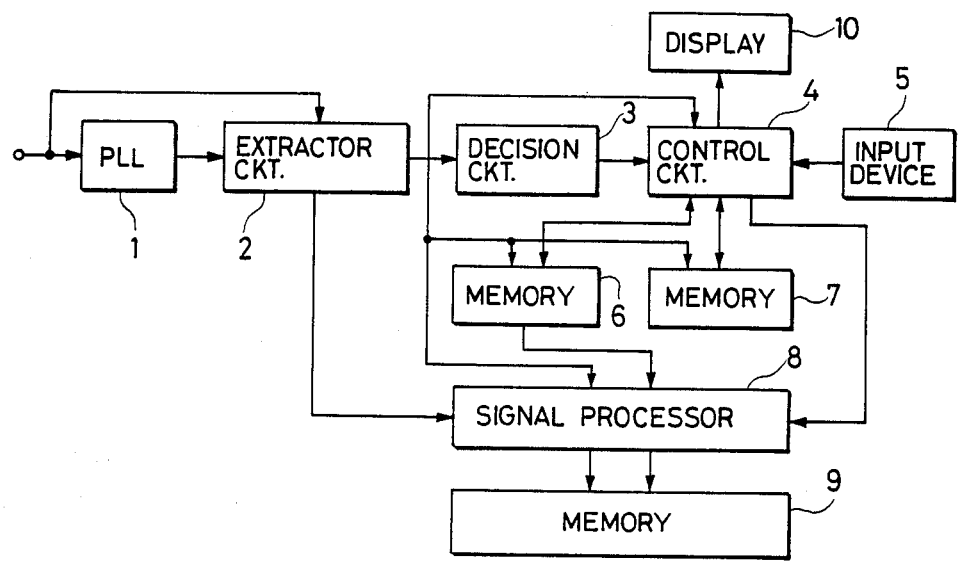
FIG. 1 is a block diagram of a magnetic recording apparatus practicing the present invention.

FIG. 1 is a block diagram illustrating the case where the magnetic recording/reproducing apparatus of the present invention is applied to an R-DAT. Shown by 1 in this figure is a PLL circuit which extracts a clock component from an incoming digital signal. The extracted clock is supplied to a data extractor circuit 2, which utilizes the clock to separate and extract sub-code data and PCM audio data from the input signal. The PCM audio data is delivered to a signal processing circuit 8 and, after being processed in that circuit, it is stored in a memory (external RAM) 9 at a predetermined address (PCM data region).

It is now assumed that a first mode is set and inputted by manipulation of input device 5. A control circuit 4, composed of a microprocessor and associated components, controls the signal processing circuit 8 in such a way that it processes the sub-code data from the extractor circuit 2 and stores it unchanged in the memory 9 at a predetermined address (sub-code data region).

If a second mode is set and inputted by manipulation of the input device 5, a decision circuit 3 evaluates the quality of a flag included in the output sub-code signal from the extractor circuit 2 and which indicates the status of error correction.

Figure 4:
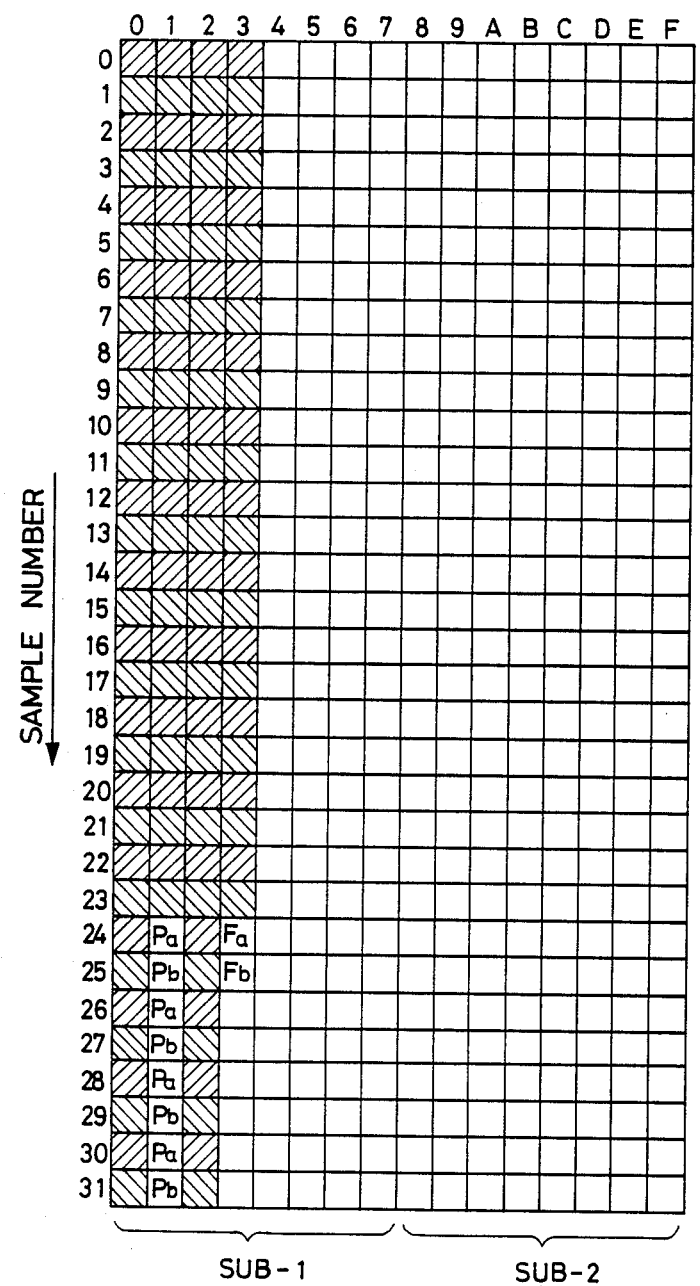
FIG. 4 is a schematic representation of the subcode data to be received by the apparatus shown in FIG. 1.

An illustrative composition of the input sub-code data is shown schematically in FIG. 4. The data recorded on the magnetic tape consists of 56 symbols, 32 of which are in an even-numbered block (e.g., block 0) and the others are the first 24 (including zero) symbols in an odd-numbered block (e.g., block 1). As for the last eight symbols (i.e., symbols 24 through 31) in the odd-numbered block, the even-numbered symbols are recorded on the magnetic tape as a parity $P_a$ for an error correction block A and the odd-numbered symbols are recorded as parity $P_b$ for an error correction block B. The data to be inputted (transmitted) is likewise composed as shown in blocks 2 and 3 in FIG. 4, namely, it consists of 56 symbols, 32 of which are in an even-numbered block (e.g., block 2). However, neither parity $P_a$ nor $P_b$ is inputted (transmitted). Instead, $C_1$ correction flags $F_a$ and $F_b$ indicating the status of error correction are inputted (transmitted). Flags $F_a$ and $F_b$ correspond to the error correction blocks A and B.

The decision circuit 3 evaluates the quality of the flags for two blocks of sub-code data stored in the memory 9 via the signal processing circuit 8. If these flags are found unacceptable (i.e, uncorrectable), the control circuit 4 controls the memory 9 to store the subsequent two blocks of data via the processing circuit 8. If the flags are found unacceptable (i.e., uncorrectable), the control circuit 4 controls the memory 9 via the processing circuit 8 in such a way that the stored two blocks of sub-code data are converted to noninformation-containing data (e.g., all data bits are set to zero).

Figure 2:
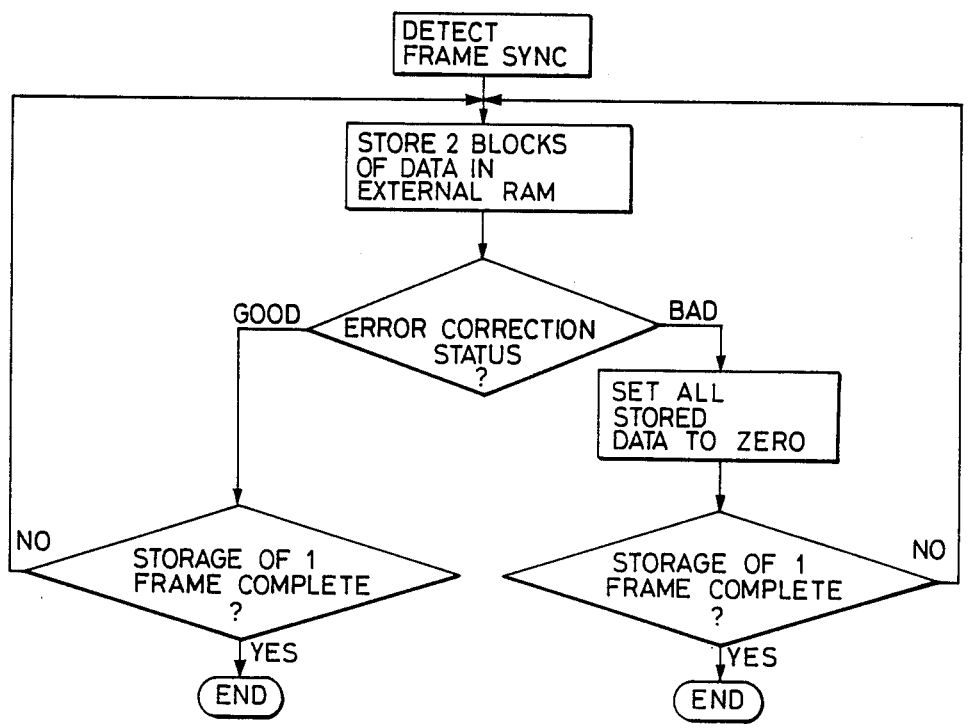
FIGS. 2 and 3 are flowcharts describing the operation of the invention.

These operations are performed for one frame of data, namely, 32 blocks of data following the detection of a frame sync. A flowchart of these procedures is shown in FIG. 2.

The sub-code data recorded in the memory 9 is successively read out as required and recorded on the magnetic tape (not shown). This prevents recording of uncorrectable sub-code data, thereby protecting an associated reproducing apparatus against erroneous operations.

Figure 3:
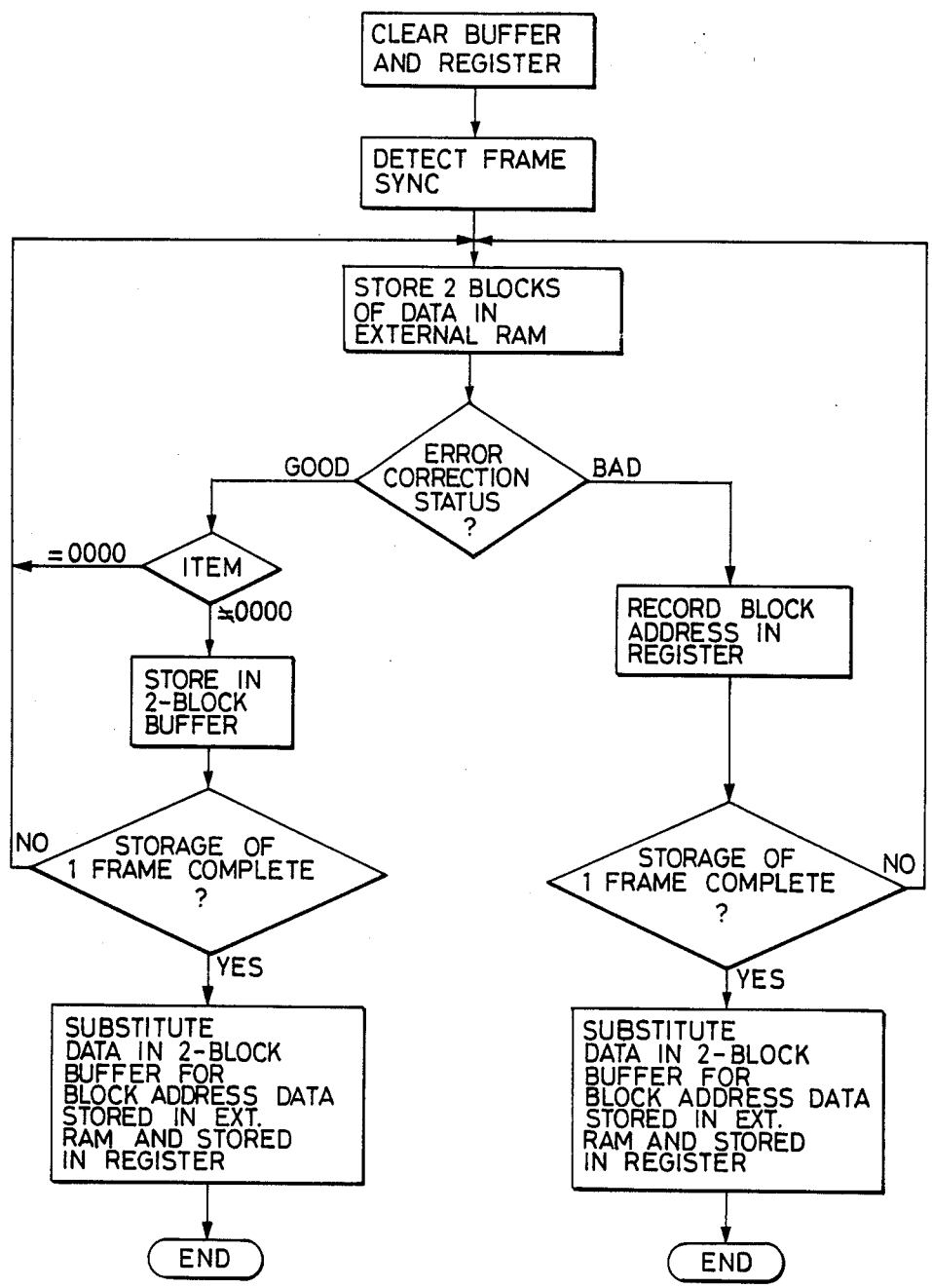

FIG. 3 is a flowchart showing operations that are typically performed when a third mode is set and inputted by manipulation of the input device 5. As shown, when two blocks of sub-code data are stored in the memory 9 via the signal processing circuit 8, the decision circuit 3 evaluates the quality of the flags associated with these two blocks of sub-code data.

If the flags are of better quality than a predetermined criterion for decision (e.g., only one error is contained in the two blocks while the criterion for acceptable flags is the existence of no more than two errors in two blocks), the control circuit 4 reads, for example, the item of the packet in the input data. If the item signifies null information (0000), the control circuit 4 controls the memory 9 in such a way that it stores the subsequent two blocks of sub-code data. The same steps are then repeated.

If the item does not signify null information (e.g., it is not 0000), the control circuit 4 controls a memory (two-block buffer) 6 in such a way that it stores two blocks of data. The operations described above are then repeated.

If the item does not have a better quality than a predetermined criterion for decision, the control circuit 4 controls a memory 7 (which is typically composed of a register and associated components) in such a way that it stores the addresses of the associated blocks. These operations are repeated.

When the above operations have been performed on one frame of data, the control circuit 4 reads out the block addresses stored in the memory 7 and controls the memory 9 in such a way that the associated sub-code data stored in the memory 9 is replaced by the data in the memory 6. The memory 6 stores the data for blocks that contain usable information which can be corrected for any errors present, while the memory 7 stores the addresses for the blocks of the data which have been found to be unreliable. The data in the unacceptable blocks is then replaced by the data of two acceptable blocks. The subcode data stored in the memory 9 are successively read out as required and recorded on the magnetic tape. Identical sub-code data can be written in one track a maximum of eight times (16 times per frame). This is effective in preventing the recording of uncorrectable sub-code data, thereby protecting the associated reproducing apparatus against erroneous operation.

A maximum of seven packets can be recorded in two blocks, and hence a magnetic tape containing more than seven packets will produce a packet that will be lost after 16 multiple writings are effected for one frame. The control circuit 4 then reads sub-code data and controls a display device 10 to display predetermined information (e.g., the number of packets). In response to the displayed information, the user may manipulate the input device 5 so as to select and input a desired mode in the manner already described above.

As has been discussed above, the magnetic recording method of the present invention includes steps of evaluating the quality of a flag in an input signal that indicates the status of error correction, storing the input signal depending upon the output of said decision circuit, replacing the data stored in the second memory is replaced with zero (null) data or with data from the first memory when the output of the decision circuit indicates that the quality of the flag is below a predetermined level, and an input device for providing an input that selects between the null data and data from the first memory. This method is effective not only in preventing the recording of highly erroneous data on magnetic tape, thereby protecting an associated reproducing apparatus against incorrect operation, but also in achieving multiple recording of correct data as required.

What is claimed is:

1. A method for recording digital data comprising the steps of:
    evaluating a quality of a flag in input data indicating a status of error correction in said input data;
    when the quality of said flag is such that any error in said input data can be corrected upon reproduction, storing the data directly in a first memory;
    when the quality of said flag is such that errors in said input data cannot be corrected upon reproduction, storing other data in place of said input data which will cause no erroneous operation upon reproduction; and
    recording the stored data on a magnetic tape.

2. The method for recording digital data of claim 1, wherein said other data comprises null data.

3. The method for recording digital data of claim 1, wherein said other data comprises other input data for which the quality of said flag is such that any errors can be corrected upon reproduction.

4. The method for recording digital data of claim 3, wherein said step of storing said other data comprises recording in a second memory addresses of input data blocks in a frame of said input data for which the quality said flag is such that errors therein cannot be corrected upon reproduction, and after receiving a frame of said input data, replacing ones of said input data blocks in said first memory for which the quality of said flag is such that errors contained therein cannot be corrected upon reproduction.

5. The method for recording digital data of claim 1, further comprising the step of providing an input mode instruction indicative of whether said other data should be null data or data for which the quality of said flag is such that any errors can be corrected upon reproduction.

6. The method for recording digital data of claim 1, further comprising the step of effecting predetermined processing operations on said data prior to storing said data.

* * * * *